United States Patent
Wang et al.

(10) Patent No.: US 12,327,185 B2
(45) Date of Patent: Jun. 10, 2025

(54) OPERATION METHOD FOR ARTIFICIAL NEURAL NETWORK

(71) Applicant: MACRONIX International Co., Ltd., Hsinchu (TW)

(72) Inventors: Wei-Chen Wang, Taipei (TW); Shu-Yin Ho, Taichung (TW); Chien-Chung Ho, Chiayi County (TW); Yuan-Hao Chang, Taipei (TW)

(73) Assignee: MACRONIX International Co., Ltd., Hsinchu (TW)

( * ) Notice: Subject to any disclaimer, the term of this patent is extended or adjusted under 35 U.S.C. 154(b) by 1246 days.

(21) Appl. No.: 17/096,575

(22) Filed: Nov. 12, 2020

(65) Prior Publication Data

US 2021/0158160 A1 May 27, 2021

Related U.S. Application Data

(60) Provisional application No. 62/939,689, filed on Nov. 25, 2019, provisional application No. 62/939,688, filed on Nov. 25, 2019.

(51) Int. Cl.
*G06N 3/08* (2023.01)
*G06F 3/06* (2006.01)
(Continued)

(52) U.S. Cl.
CPC .............. *G06N 3/08* (2013.01); *G06F 3/0604* (2013.01); *G06F 3/0659* (2013.01);
(Continued)

(58) Field of Classification Search
CPC ....... G06F 17/15–16; G06F 17/14–142; G06F 3/0604; G06F 3/0659; G06F 3/0679; G06F 12/02; G06F 12/0238
See application file for complete search history.

(56) References Cited

U.S. PATENT DOCUMENTS

2014/0149639 A1* 5/2014 Sunkavalli .......... G06F 11/1048
711/103
2017/0344880 A1* 11/2017 Nekuii .................. G06F 17/153
(Continued)

FOREIGN PATENT DOCUMENTS

| CN | 109325589 | 2/2019 |
|---|---|---|
| TW | 201331855 | 8/2013 |
| TW | 201917583 | 5/2019 |
| TW | 201939266 | 10/2019 |
| WO | 2018073975 | 4/2018 |

OTHER PUBLICATIONS

Karen Simonyan, et al., "Very Deep Convolutional Networks for Large-Scale Image Recognition", arXiv:1409.1556v6 [cs.CV], Apr. 10, 2015, pp. 1-14.
(Continued)

*Primary Examiner* — Andrew Caldwell
*Assistant Examiner* — Huy Duong
(74) *Attorney, Agent, or Firm* — J.C. PATENTS

(57) ABSTRACT

An operation method of an artificial neural network is provided. The operation method includes: dividing input information into a plurality of sub-input information, and expanding kernel information to generate expanded kernel information; performing a Fast Fourier Transform (FFT) on the sub-input information and the expanded kernel information to respectively generate a plurality of frequency domain sub-input information and frequency domain expanded kernel information; respectively performing a multiplying operation on the frequency domain expanded kernel information and the frequency domain sub-input information to respectively generate a plurality of sub-feature maps; and performing an inverse FFT on the sub-feature maps to provide a plurality of converted sub-feature maps for executing a feature extraction operation of the artificial neural network.

6 Claims, 8 Drawing Sheets

(51) Int. Cl.
  *G06F 17/14* (2006.01)
  *G06F 17/16* (2006.01)
  *G06N 3/04* (2023.01)

(52) U.S. Cl.
  CPC .......... *G06F 3/0679* (2013.01); *G06F 17/142* (2013.01); *G06F 17/16* (2013.01); *G06N 3/04* (2013.01)

(56) References Cited

U.S. PATENT DOCUMENTS

| | | | | |
|---|---|---|---|---|
| 2019/0294413 | A1* | 9/2019 | Vantrease | G06F 7/5095 |
| 2019/0340498 | A1* | 11/2019 | Mills | G06F 17/15 |
| 2020/0133989 | A1* | 4/2020 | Song | G06N 3/045 |
| 2020/0160226 | A1* | 5/2020 | Ross | G06F 7/5443 |
| 2021/0011863 | A1* | 1/2021 | Zhang | G06N 3/045 |
| 2021/0173560 | A1* | 6/2021 | Choi | G06F 3/0679 |
| 2021/0201124 | A1* | 7/2021 | Gelashvili | G06N 3/045 |
| 2021/0319289 | A1* | 10/2021 | Han | G06F 17/141 |

OTHER PUBLICATIONS

Liangzhen Lai, et al., "CMSIS-NN: Efficient Neural Network Kernels for Arm Cortex-M CPUs" arXiv:1801.06601v1 [cs.NE], Jan. 19, 2018., pp. 1-10.
Kumar Chellapilla, et al., "High Performance Convolutional Neural Networks for Document Processing" retrieved on Nov. 9, 2006, Available at: https://hal.inria.fr/inria-00112631.
Michael Mathieu, et al., "Fast Training of Convolutional Networks through FFTs" arXiv:1312.5851v5 [cs.CV], Mar. 6, 2014, pp. 1-9.
Weisstein, Eric W. "Complex Multiplication" Available at: http://mathworld.wolfram.com/ComplexMultiplication.html.
Piotr Migdal, "Learning Deep Learning with Keras", retrieved on Apr. 30, 2017, Available at: https://p.migdal.pl/2017/04/30/teaching-deep-learning.html.
Rangharajan Venkatesan, et al., "TapeCache: A High Density, Energy Efficient Cache Based on Domain Wall Memory", ISLPED'12, Jul. 30-Aug. 1, 2012, pp. 185-190.

* cited by examiner

OPERATION METHOD FOR ARTIFICIAL NEURAL NETWORK

CROSS-REFERENCE TO RELATED APPLICATION

This application claims the priority benefit of U.S. provisional application Ser. No. 62/939,688, filed on Nov. 25, 2019, and U.S. provisional application Ser. No. 62/939,689, filed on Nov. 25, 2019. The entirety of each of the above-mentioned patent applications is hereby incorporated by reference herein and made a part of this specification.

BACKGROUND

Technical Field

The invention relates to an operation method for an artificial neural network, and particularly relates to an operation method for an artificial neural network capable of improving efficiency and improving a memory service life.

Description of Related Art

In a conventional technical field, it is a common practice to perform operations of an artificial neural network through convolution operations. In order to reduce an operation time of the artificial neural network, a fine-tuning artificial neural network is widely used to avoid consuming too much time in a training phase.

Along with increase in a scale of the artificial neural network, a demand for memory capacity used for storing information required by the operation process is also increased. Therefore, how to reduce an access time delay of the memory and a power consumption of the memory during the operation process are important issues for those skilled in the art.

Referring to a system architecture diagram of a conventional artificial neural network shown in FIG. 1, taking a MNIST database as an example, an artificial neural network 100 includes a feature extraction mechanism 110 and a classification mechanism 120. The feature extraction mechanism 110 receives input information INF, and performs convolution operations on the input information INF by a plurality of feature maps arranged in layers in the feature extraction mechanism 110. Output results are generated through multiple nodes in the classification mechanism 120.

SUMMARY

The invention is directed to a plurality of operation methods for an artificial neural network, which are capable of reducing an operation amount, reducing a required memory space and providing a wear-leveling function.

The invention provides an operation method for an artificial neural network including: receiving input information and kernel information; dividing the input information into a plurality of sub-input information, and expanding the kernel information to generate expanded kernel information; performing a fast Fourier transform (FFT) on the sub-input information and the expanded kernel information to respectively generate a plurality of frequency domain sub-input information and frequency domain expanded kernel information; respectively performing a multiplying operation on the frequency domain expanded kernel information and the frequency domain sub-input information to respectively generate a plurality of sub-feature maps; and performing an inverse FFT on the sub-feature maps to provide a plurality of converted sub-feature maps for executing a feature extraction operation of the artificial neural network.

The invention provides another operation method for an artificial neural network including: receiving input information and kernel information; performing a multiplying operation on the input information and the kernel information to generate a feature map; writing the kernel information into a first block of a non-volatile memory according to a first address; performing an adjustment operation on the kernel information; and, in the adjustment operation, receiving adjustment information and changing a plurality of most significant bits in the first address of the non-volatile memory according to the adjustment information, and keeping a plurality of least significant bits of the kernel information in the first address unchanged.

Based on the above description, in the operation method of the artificial neural network of the embodiment of the invention, by dividing the input information into a plurality of sub-input information, each sub-input information and the expanded kernel information are multiplied in a frequency domain to generate a plurality of sub-feature maps. By making a size of the sub-input information close to the kernel information, and through the operation method of the frequency domain, an operation amount and a required memory space may be effectively reduced, which improves operation efficiency. In the embodiment of the invention, in an updating operation of the kernel information, by only updating a part of bits, the access operation of the non-volatile memory may achieve a wear-leveling function, so as to increase a service life.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
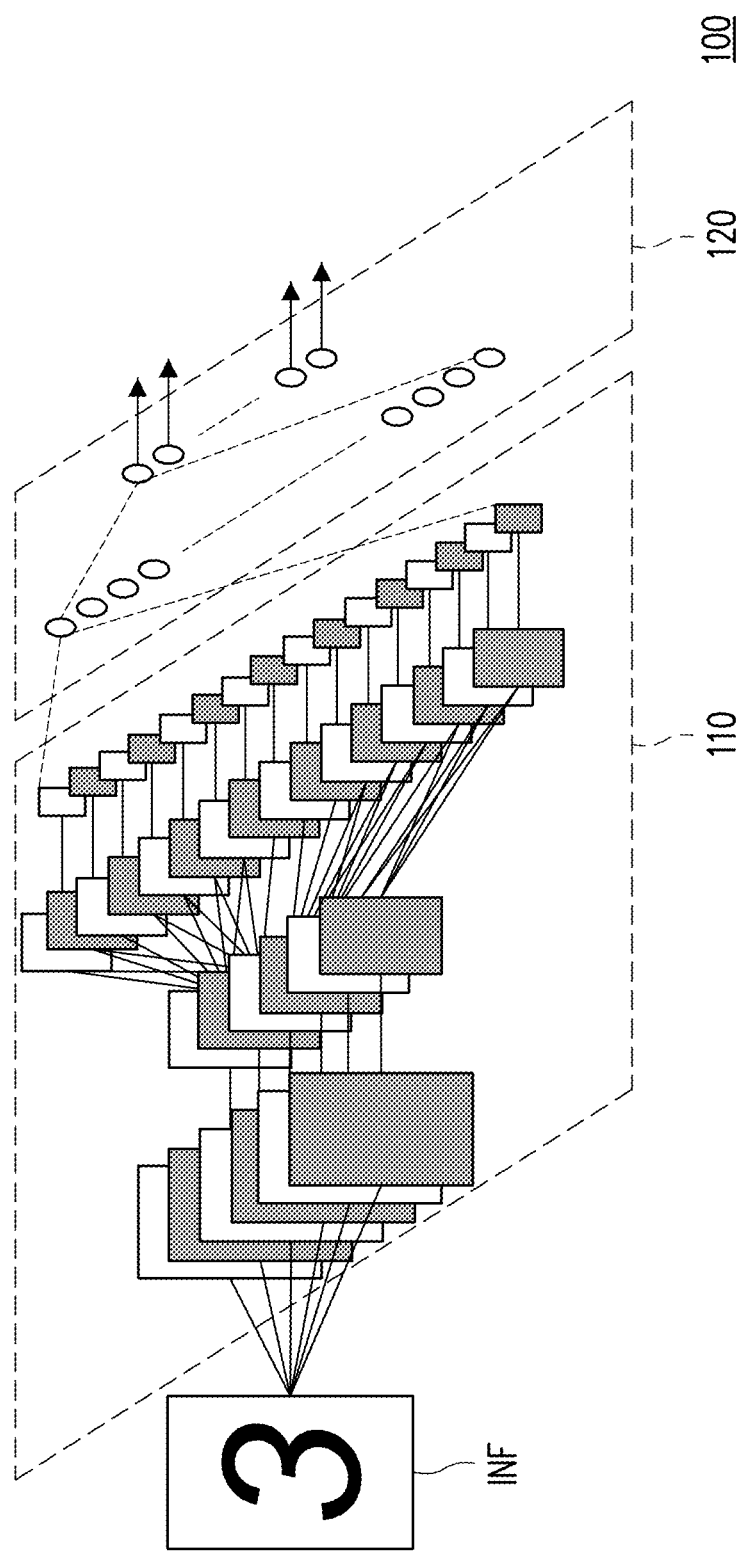
FIG. 1 is a diagram of a system framework of a conventional artificial neural network.
Figure 2:
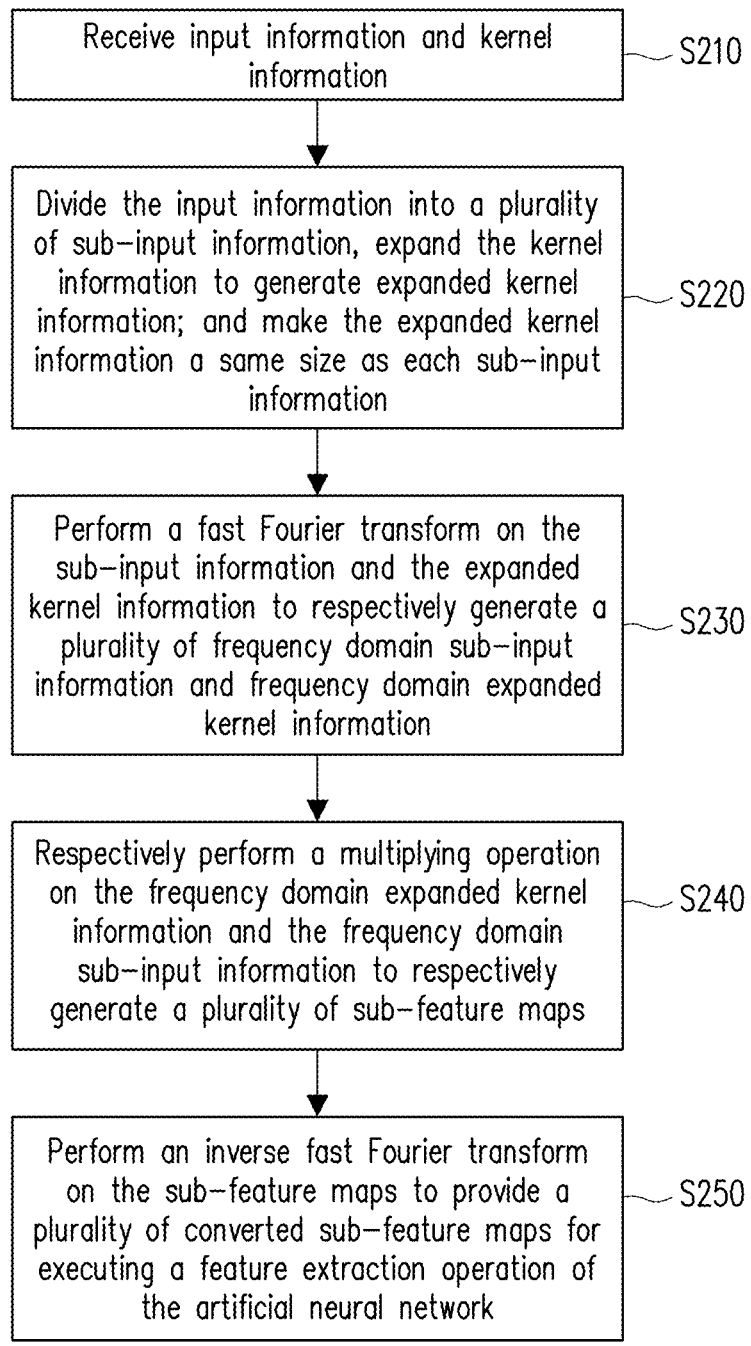
FIG. 2 is a flowchart illustrating an operation method of an artificial neural network according to an embodiment of the invention.
Figure 3:
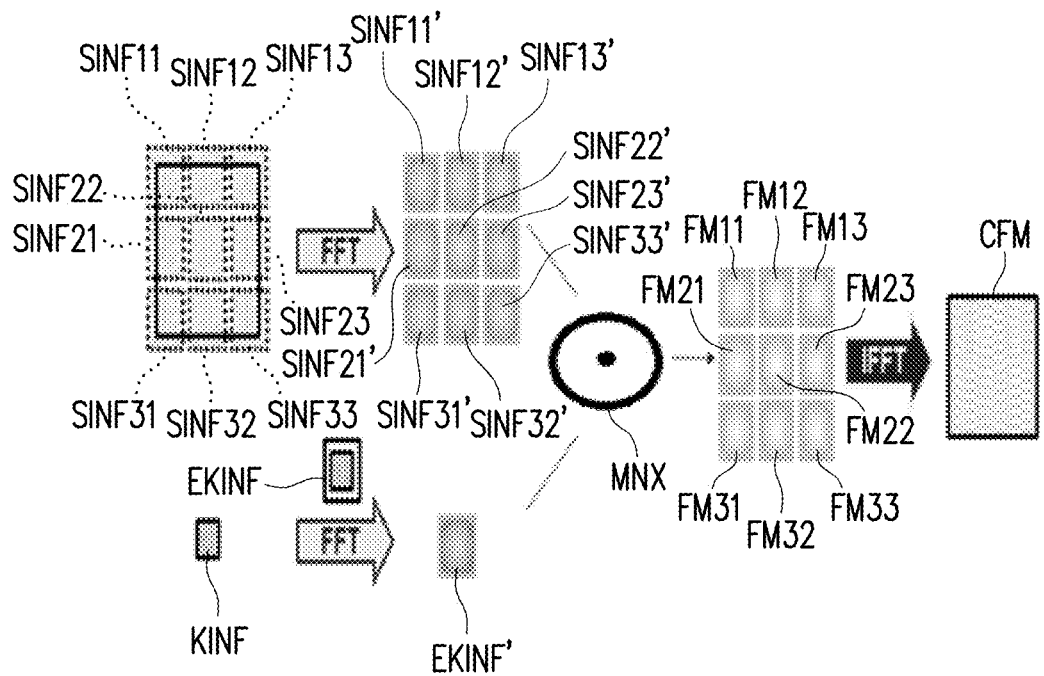
FIG. 3 is a schematic diagram of operations of an artificial neural network according to an embodiment of the invention.

Referring to FIG. 2, FIG. 2 is a flowchart illustrating an operation method of an artificial neural network according to an embodiment of the invention, and FIG. 3 is a schematic diagram of operations of an artificial neural network according to an embodiment of the invention. In step S210, input information INF and kernel information KINF are received, where the input information INF and the kernel information KINF may all be matrix-type information. Then, in step S220, the input information INF is divided into a plurality of sub-input information SINF11-SINF33, and the kernel information KINF is expanded to generate expanded kernel information EKINF, so that the expanded kernel information EKINF and each of the sub-input information SINF11-SINF33 have a same size.

In detail, a size of each of the sub-input information SINF11-SINF33 may be set to be closest to a size of the kernel information KINF, and the size of each of the sub-input information SINF11-SINF33 needs to be set to an $N^{th}$ power of 2 times the $N^{th}$ power of 2, N is a positive integer. In the embodiment of FIG. 3, the size of the kernel information KINF is, for example, 5×5, the size of each of the sub-input information SINF11-SINF33 may be set to 8×8.

It should be noted that a combined size of the sub-input information SINF11-SINF33 may be slightly larger than or equal to the size of the input information INF, and the input information INF may be effectively divided into a plurality of $2^N \times 2^N$ sub-input information SINF11-SINF33. In the embodiment, if the size of the input information INF is less than 24×24, the insufficient part may be filled with 0, so that the input information INF may be divided into 3×3 (=9) sub-input information SINF11-SINF33 of 8×8, respectively.

In addition, regarding the expansion operation of the kernel information KINF, a plurality of elements of 0 are added to the kernel information KINF to generate the expanded kernel information EKINF, and a size of the expanded kernel information EKINF and the size of each of the sub-input information SINF11-SINF33 are the same. In the embodiment, the size of the kernel information KINF is, for example, 5×5, and it is required to add 39 elements of 0 to generate the expanded kernel information EKINF with the size of 8×8.

Then, in step S230, a fast Fourier transform (FFT) is respectively performed on the sub-input information SINF11-SINF33 and the expanded kernel information EKINF to respectively generate a plurality of frequency domain sub-input information SINF11'-SINF33' and frequency domain expanded kernel information EKINF'.

In step S240, a multiplying operation MUX is respectively performed on the frequency domain expanded kernel information EKINF' and the frequency domain sub-input information SINF11'-SINF33' to respectively generate a plurality of sub-feature maps FM11-FM33. The multiplication operation MUX is to multiply a plurality of first elements in the frequency domain expanded kernel information EKINF' with a plurality of second elements corresponding to the same positions in each of the frequency domain sub-input information SINF11'-SINF33' to generate each of the sub-feature maps FM11-FM33.

Finally, in step S250, an inverse FFT (IFFT) is performed on the sub-feature maps FM11-FM33 to generate a converted feature map CFM composed of a plurality of converted sub-feature maps. The converted feature map CFM may be provided to execute a feature extraction operation of the artificial neural network 200.

It should be noted that in the embodiment, the kernel information KINF does not need to be expanded to the same size as the input information INF, and under the condition that the input information INF is divided into multiple small-sized sub-input information SINF11-SINF33, an operation amount of the multiplication operation may be effectively reduced, and accuracy of the multiplication operation may also be effectively improved.

Figure 4:
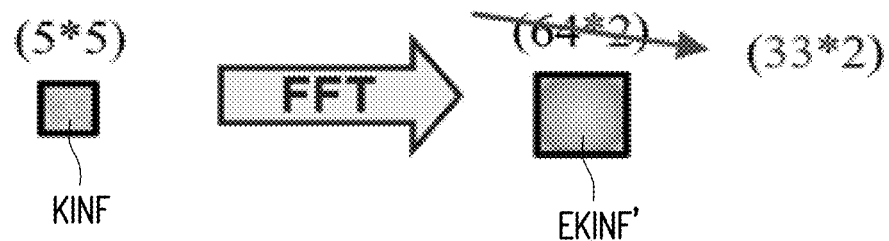
FIG. 4 illustrates a size relationship between kernel information and frequency domain expanded kernel information according to an embodiment of the invention.

It should be noted that when the FFT is performed on the expanded kernel information EKINF and the sub-input information SINF11-SINF33, each of the generated frequency domain expanded kernel information EKINF' and the frequency domain sub-input information SINF11'-SINF33' has real part information and imaginary part information. In the embodiment, FIG. 4 illustrates a size relationship between the kernel information and the frequency domain expanded kernel information according to an embodiment of the invention, where the size of the kernel information KINF is, for example, 5×5, and the size of the correspondingly generated frequency domain expanded kernel information EKINF' is 8×8×2 (64×2). However, in the frequency domain expanded kernel information EKINF', the combination of the real part information and the imaginary part information may exist in the form of conjugate complex numbers. Therefore, in the embodiment of the invention, regarding the two elements of the frequency domain expanded kernel information EKINF' which are conjugate complex numbers, only one element needs to be recorded. Namely, only 33×2 elements need to be stored in the memory, which may reduce a demand for memory capacity.

It should be noted that, in the embodiment of the invention, the information required for the operation process of the artificial neural network 100 may all be stored in a non-volatile memory, such as a phase-change memory (PCM). Compared with a dynamic random access memory, the PCM has advantages of small size and low standby power consumption, which may optimize the performance of the artificial neural network 100.

Figure 5A:
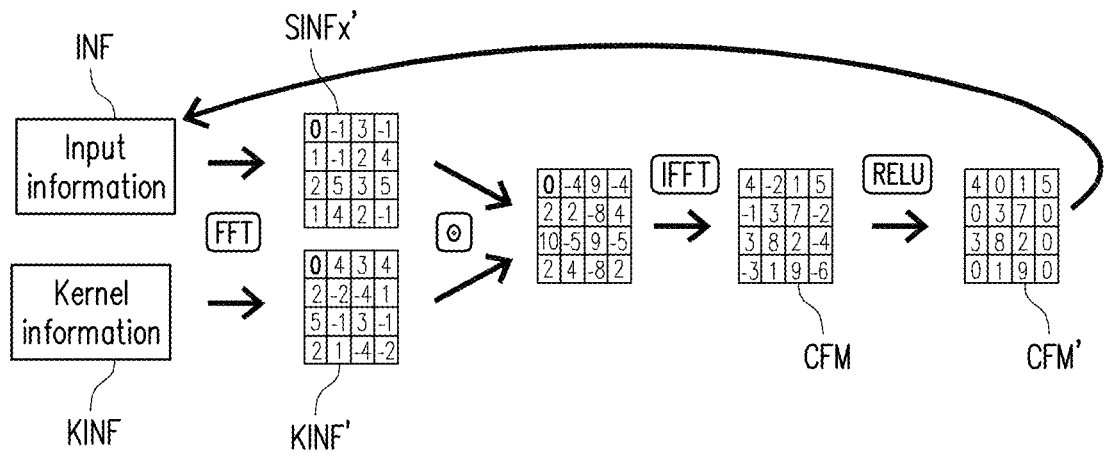
FIG. 5A to FIG. 5C are schematic diagrams of other implementations of an operation method of an artificial neural network according to other embodiments of the invention.
Figure 5B:
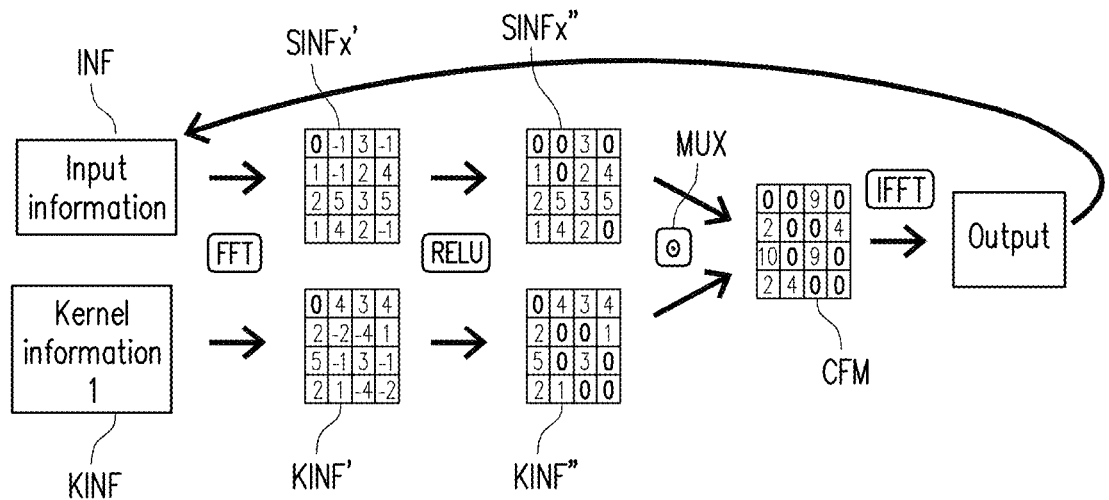
Figure 5C:
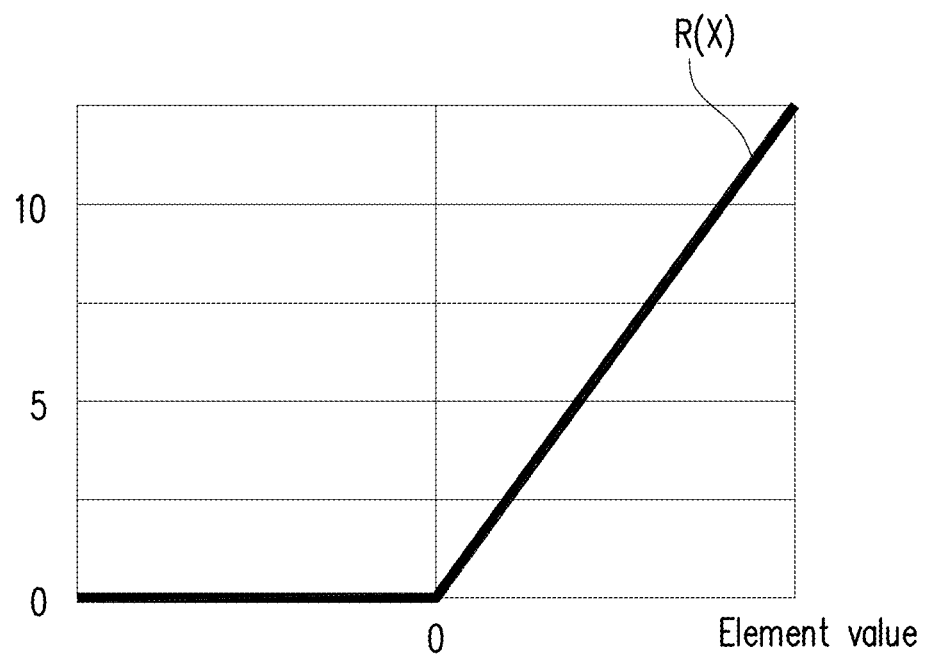

Referring to FIG. 5A to FIG. 5C, FIG. 5A to FIG. 5C are schematic diagrams of other implementations of the operation method of the artificial neural network according to other embodiments of the invention. In FIG. 5A, after completing the operations of steps S210 to S250 in FIG. 2 on the input information INF and the kernel information KINF, a linear rectification operation RELU may be performed on the generated converted feature map CFM. The linear rectification operation RELU may adjust values of a plurality of elements in the converted feature map CFM. In the embodiment, the linear rectification operation RELU may change each element that is less than 0 in the converted feature map CFM to be equal to 0, and keep the elements that are not less than 0 in the converted feature map CFM unchanged, and generate a rectified converted feature map CFM'. Through the linear rectification operation RELU, the operation requirements of the artificial neural network may be further simplified, and an operation speed may be improved.

In FIG. 5B, compared with the embodiment in FIG. 5A, the linear rectification operation RELU may be set before the multiplication operation MUX to execute for each frequency domain sub-input information SINFx' and the frequency domain expanded kernel information EKINF', and set the elements that are less than 0 in the frequency domain sub-input information SINFx' and the frequency domain expanded kernel information EKINF' to 0, and keep the elements that are not less than 0 in the frequency domain sub-input information SINFx' and the frequency domain expanded kernel information EKINF' unchanged, so as to respectively generate rectified frequency domain sub-input information SINFx" and frequency domain expanded kernel information EKINF". In this way, an operation amount of the multiplication operation MUX performed on the rectified frequency domain sub-input information SINFx" and the frequency domain expanded kernel information EKINF" may be effectively reduced, thereby improving the operation efficiency.

The linear rectification operation RELU may be executed through a function R(X) shown in FIG. 5C. A horizontal axis of FIG. 5C corresponds to the values of the elements performing the rectification operation, and a vertical axis of FIG. 5C is the results of the rectification operation. The function R(X) may be a line with a slope equal to 1 in a section where the element value is greater than or equal to 0.

Figure 6:
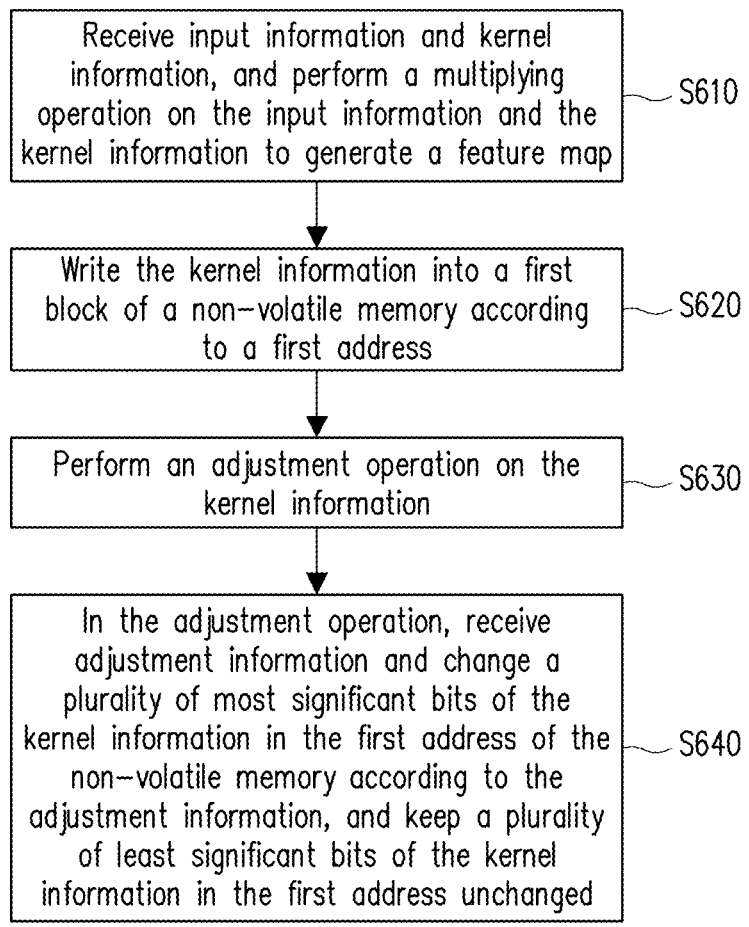
FIG. 6 is a flowchart of an operation method of an artificial neural network according to another embodiment of the invention.

In the embodiment of the invention, since the non-volatile memory is used as a storage medium for operation information, in order to maintain a service life of the non-volatile memory, the invention provides an embodiment that may implement a wear-leveling function for the access of the non-volatile memory. Referring to FIG. 6, FIG. 6 is a flowchart of an operation method of an artificial neural network according to another embodiment of the invention. In step S610, input information and kernel information are received, and a multiplying operation is performed on the input information and the kernel information to generate a feature map. Regarding implementation details of step S610, reference may be made to the embodiment of FIG. 2 of the invention for implementation, and the related descriptions have been described in detail, which are not repeated.

In step S620, the kernel information is written into a first block of a non-volatile memory according to a first address. In step S630, an adjustment operation is performed on the kernel information. In the adjustment operation, through step S640, adjustment information is received to change a plurality of most significant bits of the kernel information in the first address of the non-volatile memory according to the adjustment information, and keep a plurality of least significant bits of the kernel information unchanged.

In the embodiment, in each adjustment operation of the kernel information, by updating only the most significant bits of the kernel information, a frequency of writing memory cells of the non-volatile memory may be effectively reduced. The least significant bits of the kernel information have little effect on the operation result of the artificial neural network, so that the least significant bits of the kernel information are not changed, which does not affect the operation result of the artificial neural network.

In the embodiment, a bit number of the least significant bits may be 8 bits or 16 bits.

Figure 7:
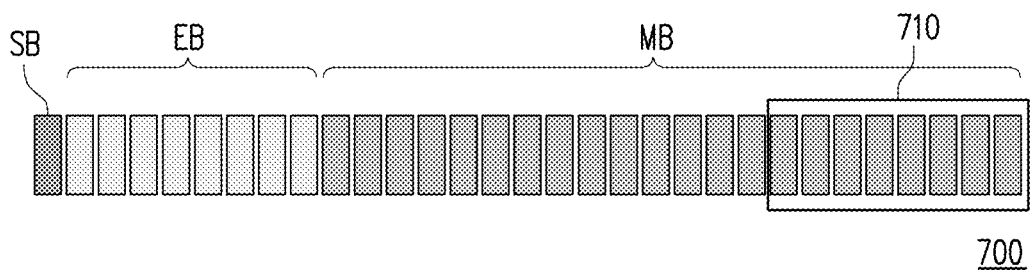
FIG. 7 is a schematic diagram of kernel information according to an embodiment of the invention.

Referring to FIG. 7, FIG. 7 is a schematic diagram of kernel information according to an embodiment of the invention. Kernel information 700 has a sign bit SB, exponential bits EB, and mantissa bits MB. A part of the mantissa bits MB are least significant bits 710, and another part of the mantissa bits MB are combined with the sign bit SB and the exponent bits EB to form the most significant bits. When performing the adjustment operation of the kernel information 700, the least significant bits 710 may not be updated, so as to reduce the number of times for writing the memory cells.

Figure 8:
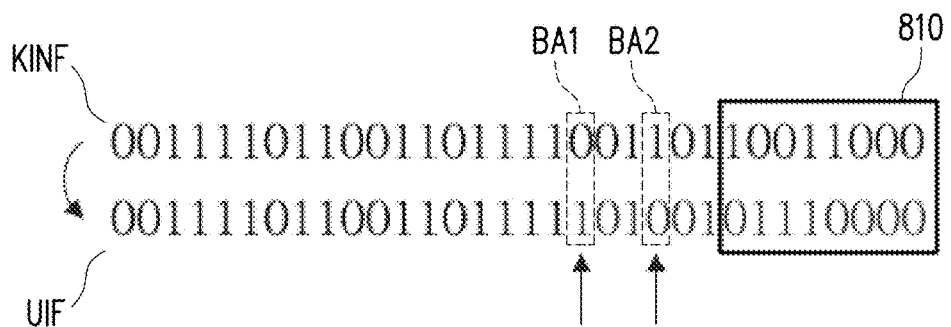
FIG. 8 is a schematic diagram of an adjustment operation of the kernel information according to an embodiment of the invention.

Referring to FIG. 8, FIG. 8 is a schematic diagram of an adjustment operation of the kernel information according to an embodiment of the invention. When the kernel information KINF is required to be adjusted based on adjustment information UIF, although eight least significant bits 810 of the kernel information KINF are different from the corresponding bits of the adjustment information UIF, it is unnecessary to perform the adjustment operation. Regarding the most significant bits of the kernel information KINF, the adjustment information UIF may be compared with the kernel information KINF first, and bits BA1 and BA2 that need to be changed in the most significant bits are found. Moreover, the writing operation is performed only on the memory cells corresponding to the bits BA1 and BA2 that need to be changed, which may effectively reduce the frequency of writing the memory cells.

The number of the bits BA1 and BA2 that need to be changed may be one or plural, which is not limited by the invention.

Figure 9:
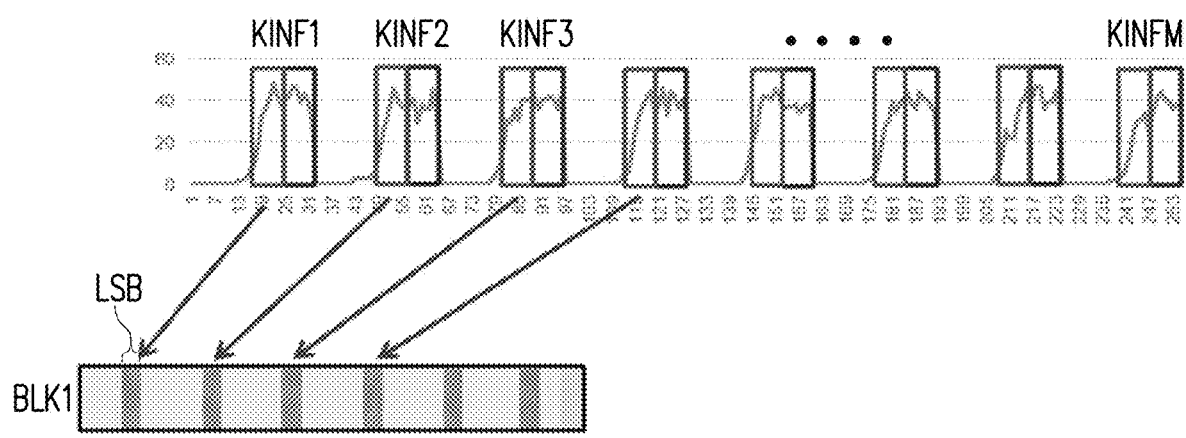
FIG. 9 is a schematic diagram of a storage method of the kernel information according to an embodiment of the invention.

Referring to FIG. 9, FIG. 9 is a schematic diagram of a storage method of the kernel information according to an embodiment of the invention. When there is a plurality of kernel information KINF1-KINFM in the artificial neural network, the kernel information KINF1-KINFM may be continuously stored in a first block BLK1 of the non-volatile memory. When recording for the first time, the kernel information KINF1-KINFM may be written to the first block BLK1 integrally and continuously. When any one of the kernel information KINF1~KINFM needs to be adjusted subsequently, the part of the least significant bits of the kernel information KINF1-KINFM is not adjusted. Taking the kernel information KINF1 as an example, when the kernel information KINF1 needs to be adjusted, a least significant bit LSB of the kernel information KINF1 is not adjusted.

Figure 10:
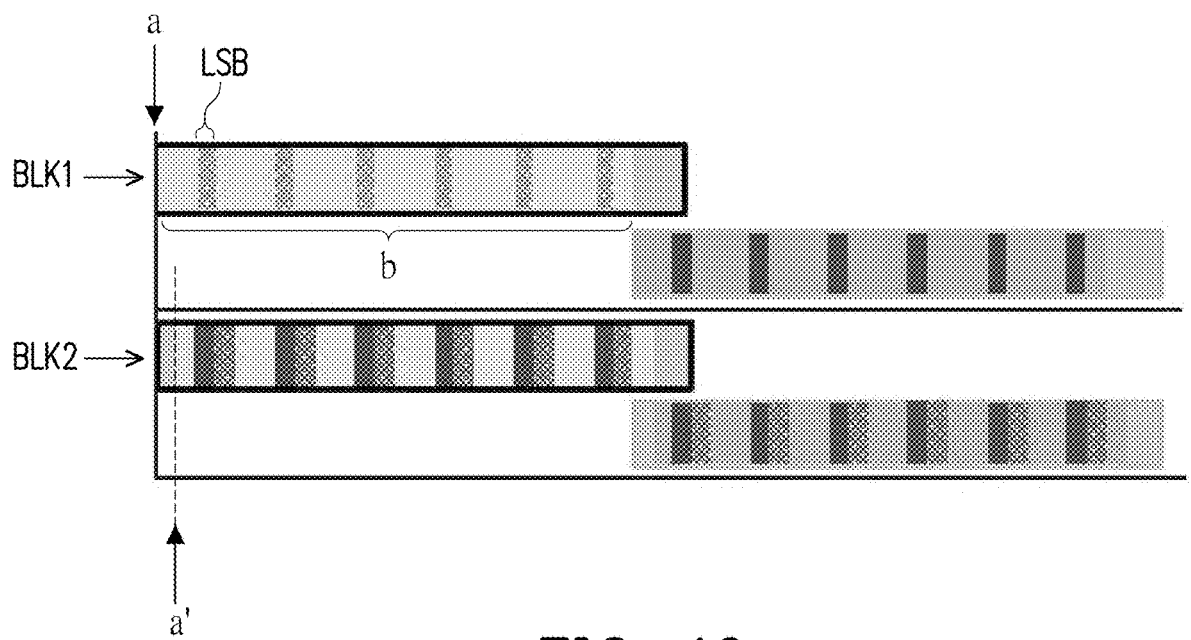
FIG. 10 is a schematic diagram of an adjustment operation of the kernel information according to another embodiment of the invention.

Referring to FIG. 10, FIG. 10 is a schematic diagram of an adjustment operation of the kernel information according to another embodiment of the invention. In FIG. 10, when the kernel information is recorded for the first time, a plurality of the kernel information may be written to the first block BLK1 of the non-volatile memory according to a first address a. When the kernel information is changed, the least significant bit LSB in the kernel information may not be changed.

In the embodiment, the number of changes to the kernel information may be recorded, and when the number of changes to the kernel information is greater than a predetermined threshold, the first address a may be shifted by an address b, and the kernel information is integrally written into the first block BLK1 according to a new address a+b.

In addition, based on the above description, when the number of changes to the kernel information is again greater than the predetermined threshold in the new address, the address a may be shifted by a shift value (8 bits) to generate a new address a', and the kernel information is integrally written into a second block BLK2 according to the new address a'.

From the above description, it is known that the kernel information may be written into different regions of the non-volatile memory along with the number of times of adjustments, so as to effectively implement the wear-leveling function.

Figure 11:
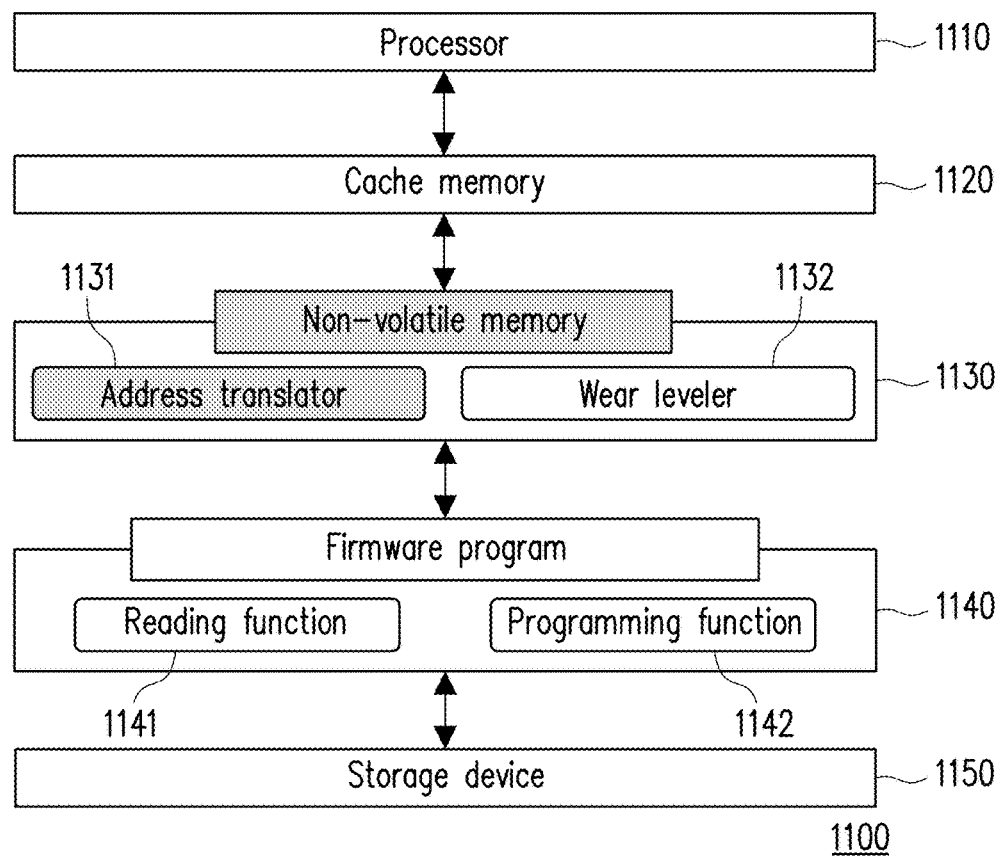
FIG. 11 is a diagram of a system framework of an operation system of an artificial neural network according to an embodiment of the invention.

Referring to FIG. 11, FIG. 11 is a diagram of a system framework of an operation system of an artificial neural network according to an embodiment of the invention. An operation system 1100 includes a processor 1110, a cache memory 1120, a non-volatile memory 1130, a firmware program 1140, and a storage device 1150. The processor 1110 may be any type of processor with computing capability, and is used to perform artificial neural network operations. The non-volatile memory 1130 has an address translator 1131 and a wear leveler 1132. The address translator 1131 is used to support a calculation operation of the feature map as that shown in the operation flow of FIG. 2 of the invention. The wear leveler device 1132 is used to support an wear-leveling operation as that shown in the operation flow of FIG. 6 of the invention.

The firmware program 1140 has a reading function 1141 and a programming function 1142. The firmware program 1140 is provided to the processor 1110 for execution to implement the reading function 1141 or the programming function 1142 on the non-volatile memory 1130.

In the embodiment, the storage device 1150 may be any form of hard disk, such as a conventional hard disk drive or a solid state hard disk, which is not limited by the invention. The storage device 1150 may provide a supply medium for the input information of the artificial neural network, and may be used to store static or dynamic information required for the artificial neural network operations.

In summary, in the invention, by dividing the input information into a plurality of sub-input information, each sub-input information and the expanded kernel information are multiplied in a frequency domain to generate a plurality of sub-feature maps, which may effectively reduce an operation amount, and reduces a demand for memory capacity. In addition, the embodiment of the invention provides the non-volatile memory as the access medium for the kernel information. The embodiment of the invention further provides an adjustment method of the kernel information, which may effectively achieve the wear-leveling function of the non-volatile memory and improve the service life of the system.

What is claimed is:

1. An operation method for an artificial neural network, comprising:
receiving input information and kernel information;
dividing the input information into a plurality of sub-input information, expanding the kernel information to generate expanded kernel information; and making the expanded kernel information a same size as each sub-input information;
performing a fast Fourier transform on the sub-input information and the expanded kernel information to respectively generate a plurality of frequency domain sub-input information and frequency domain expanded kernel information;
respectively performing a multiplying operation on the frequency domain expanded kernel information and the frequency domain sub-input information to respectively generate a plurality of sub-feature maps;
performing an inverse fast Fourier transform on the sub-feature maps to provide a plurality of converted sub-feature maps for executing a feature extraction operation of the artificial neural network;
performing a linear rectification operation on each of the frequency domain sub-input information and the frequency domain expanded kernel information, so that elements less than 0 in each of the frequency domain sub-input information and the frequency domain expanded kernel information are set to 0;
writing the kernel information into a first block of a non-volatile memory according to a first address;
performing an adjustment operation on the kernel information; and
in the adjustment operation, receiving adjustment information and changing a plurality of most significant bits of the kernel information in the first address of the non-volatile memory according to the adjustment information, and keeping a plurality of least significant bits of the kernel information in the first address unchanged;
wherein when a number of executions of the adjustment operation is greater than a predetermined threshold, shifting the first address to a second address or adding the first address by a shift value to obtain a second address, and
writing the kernel information into a second block of the non-volatile memory according to the second address.

2. The operation method for the artificial neural network as claimed in claim 1, wherein the step of expanding the kernel information to generate the expanded kernel information comprises:
filling the kernel information with a plurality of elements of 0 so that the expanded kernel information and each of the sub-input information have a same size.

3. The operation method for the artificial neural network as claimed in claim 1, wherein a size of each of the sub-input information is an $N^{th}$ power of 2 times the $N^{th}$ power of 2, and N is a positive integer.

4. The operation method for the artificial neural network as claimed in claim 1, wherein the step of respectively performing the multiplying operation on the frequency domain expanded kernel information and the frequency domain sub-input information comprises:
respectively multiplying a plurality of first elements in the frequency domain expanded kernel information with a plurality of second elements corresponding to the same positions in each of the frequency domain sub-input information to generate each of the sub-feature maps.

5. The operation method for the artificial neural network as claimed in claim 1, wherein the step of changing the most significant bits of the kernel information in the first address of the non-volatile memory comprises:
comparing the adjustment information with the most significant bits, and finding out at least one bit that needs to be changed from the most significant bits; and
only writing the at least one bit that needs to be changed.

6. The operation method for the artificial neural network as claimed in claim 1, wherein a bit number of the least significant bits is 8 or 16.

* * * * *